Oct. 28, 1930.  J. WHITELEY  1,779,651
AMUSEMENT APPARATUS
Filed Dec. 24, 1927   6 Sheets-Sheet 1

Inventor:
James Whiteley,
by Rippey & Kingsland.
His Attorneys.

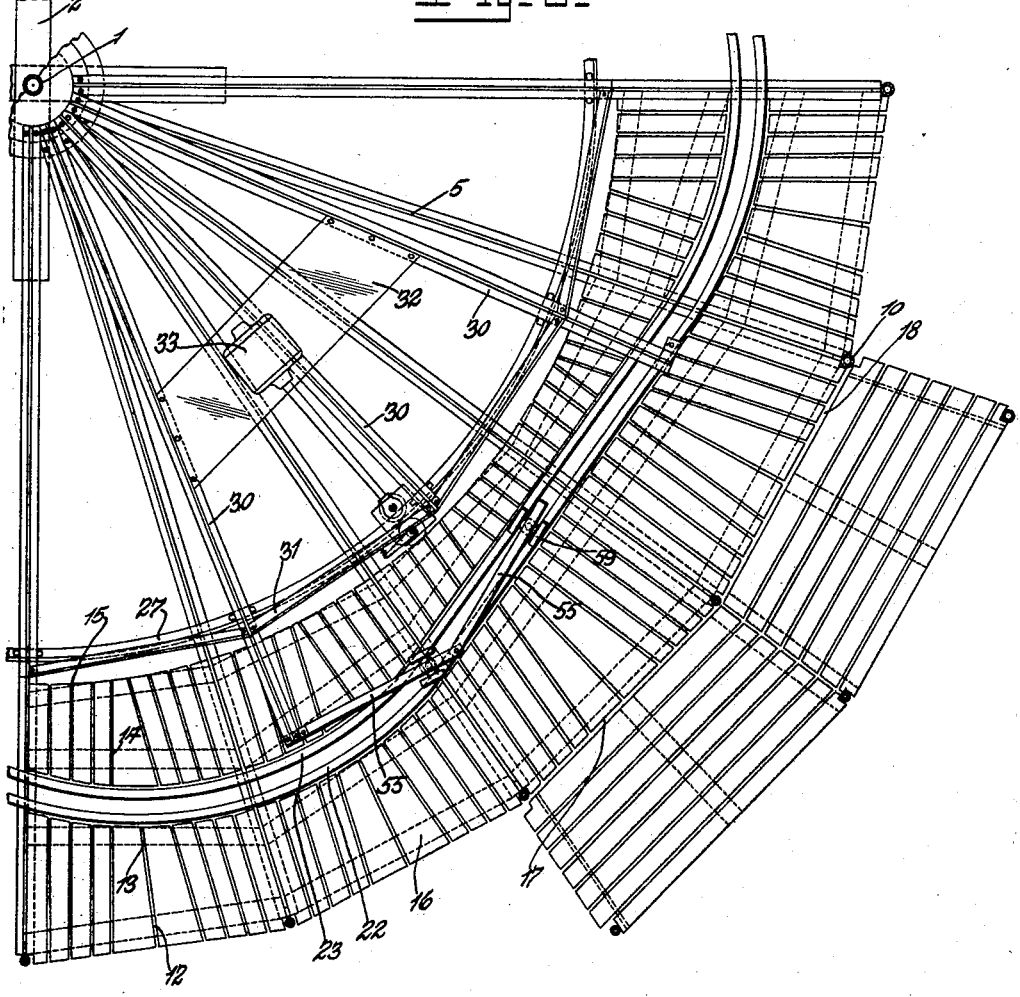

Oct. 28, 1930.  J. WHITELEY  1,779,651
AMUSEMENT APPARATUS
Filed Dec. 24, 1927   6 Sheets-Sheet 3
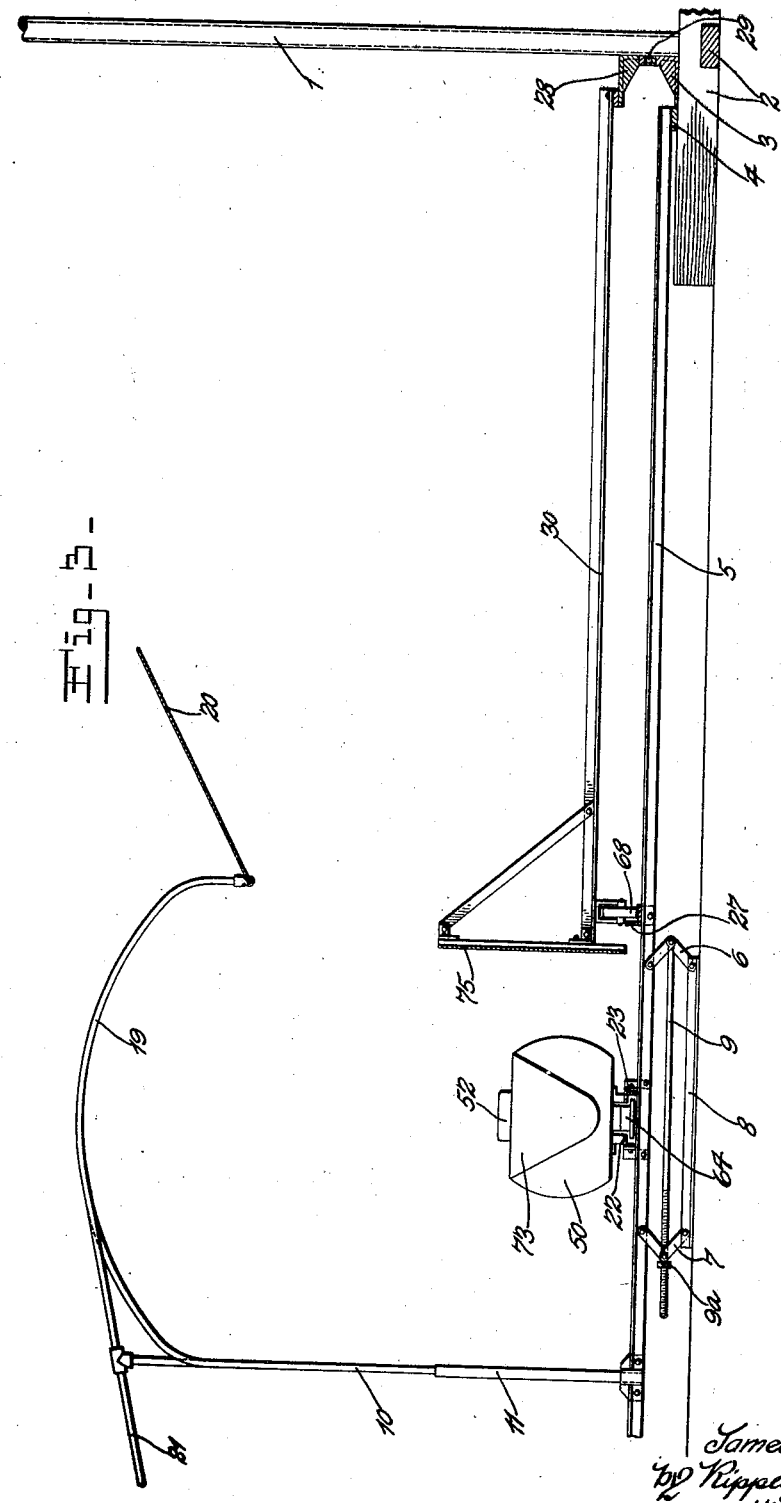

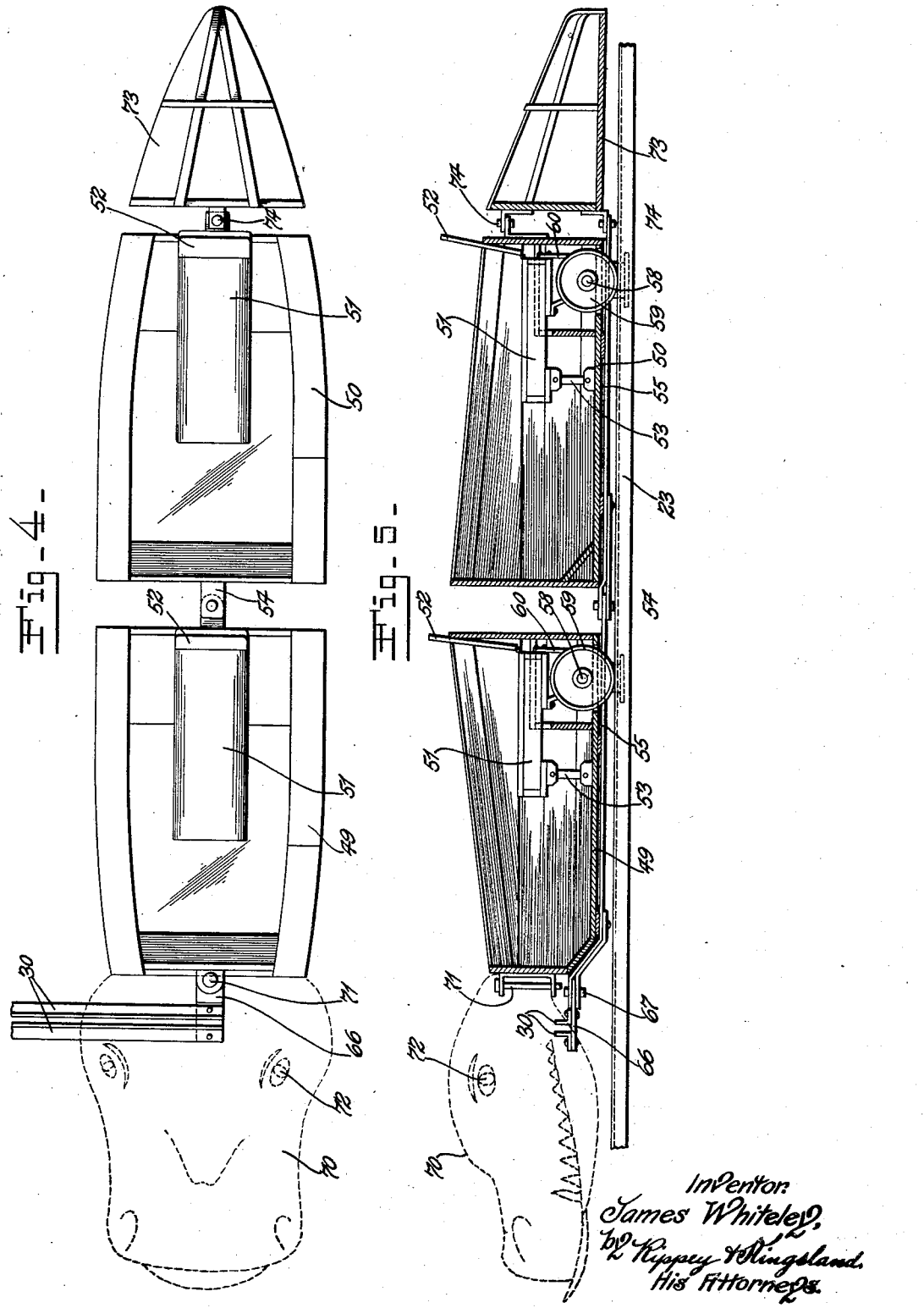

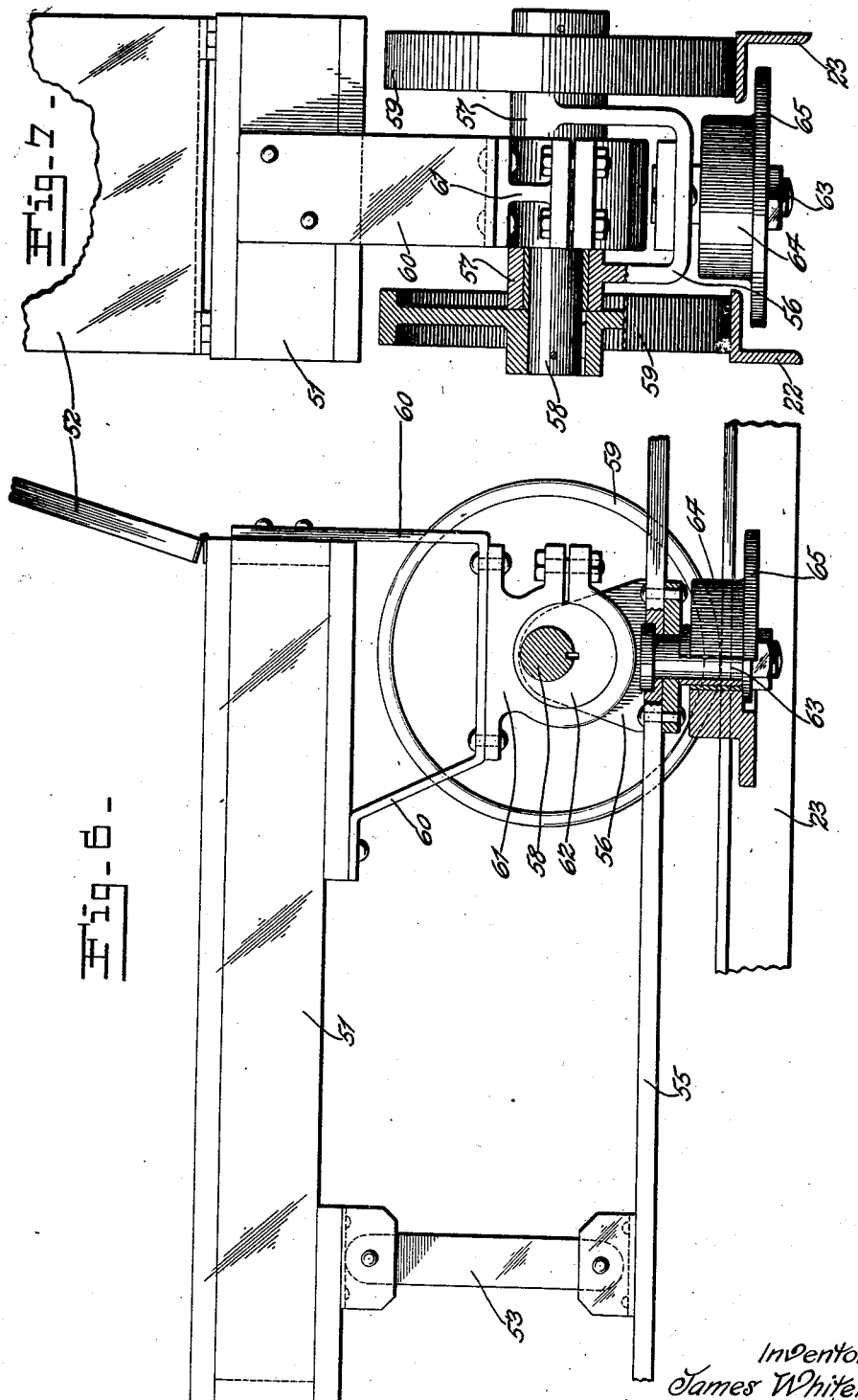

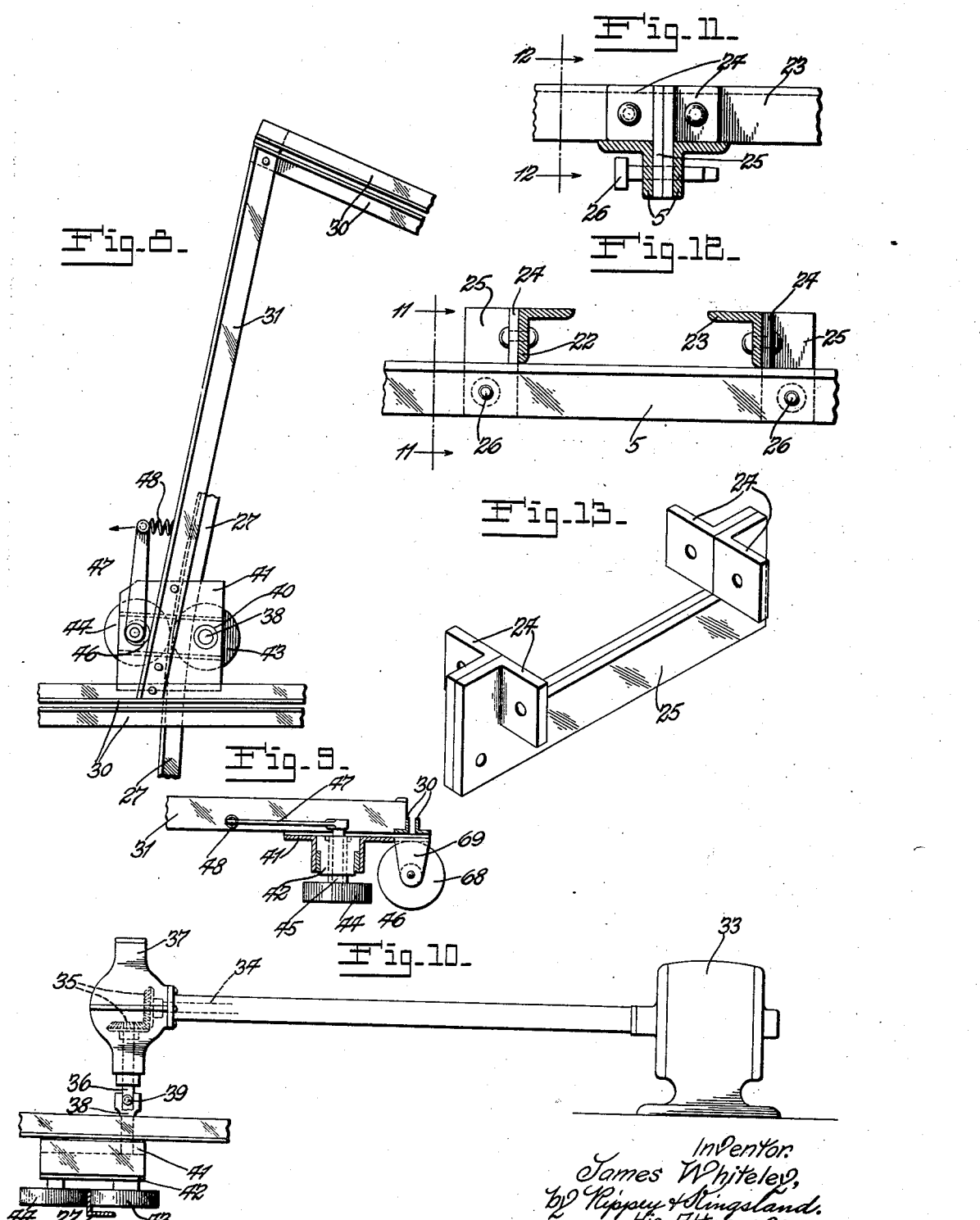

Patented Oct. 28, 1930

1,779,651

UNITED STATES PATENT OFFICE

JAMES WHITELEY, OF NORTH TONAWANDA, NEW YORK

AMUSEMENT APPARATUS

Application filed December 24, 1927. Serial No. 242,322.

This invention relates to an amusement apparatus.

An object of the invention is to provide an amusement apparatus comprising an endless track having one or more passenger vehicles mounted therein, in combination with improved means for propelling the vehicle or vehicles along the track, and means for preventing derailment of the vehicle or vehicles.

Another object of the invention is to provide an amusement apparatus comprising an endless track including curved and eccentric portions, and one or more passenger vehicles mounted on the track, in combination with a movable support, driving mechanism mounted on and carried by the support, and mechanism driven by the driving mechanism for propelling the vehicle or vehicles along the track, and also propelling said support so that the driving mechanism is carried thereby during operation of the apparatus.

Another object of the invention is to provide an amusement apparatus comprising one or more passenger vehicles, in combination with mechanism for propelling the vehicles along the track, means cooperative with the track to impart lateral oscillatory movements to the vehicles, and means operated by the propelling mechanism to impart vertical oscillatory movements to the vehicle seats.

Other objects will appear from the following description, reference being made to the accompanying drawings, in which Fig. 1 is a diagrammatic plan view of the stationary frame of the apparatus and the superimposed movable frame for operating the passenger vehicles.

Fig. 2 is an enlarged plan view of a portion of the apparatus showing the driving mechanism mounted on the movable frame.

Fig. 3 is a vertical cross sectional view of one side of the apparatus.

Fig. 4 is a plan view of a preferred type of passenger vehicle.

Fig. 5 is a vertical longitudinal sectional view of the preferred type of passenger vehicle.

Fig. 6 is a side elevation of one of the vehicle seats showing the devices for imparting vertical oscillatory movements to the seat and the devices for preventing derailment of the vehicle and imparting lateral oscillatory movements to the vehicle.

Fig. 7 is a rear end elevation of the devices shown in Fig. 6.

Fig. 8 is an inverted plan view of part of the propelling mechanism.

Fig. 9 is a side elevation of a part of the propelling mechanism, with parts shown in section.

Fig. 10 is a view showing the connection of the motor with the propelling mechanism of Figs. 8 and 9.

Fig. 11 is a sectional view of the movable frame, on the line 11—11 of Fig. 12, showing the track supports.

Fig. 12 is a sectional view of the track on the line 12—12 of Fig. 11.

Fig. 13 is a perspective view of one of the track rails supporting elements.

Figure 1:
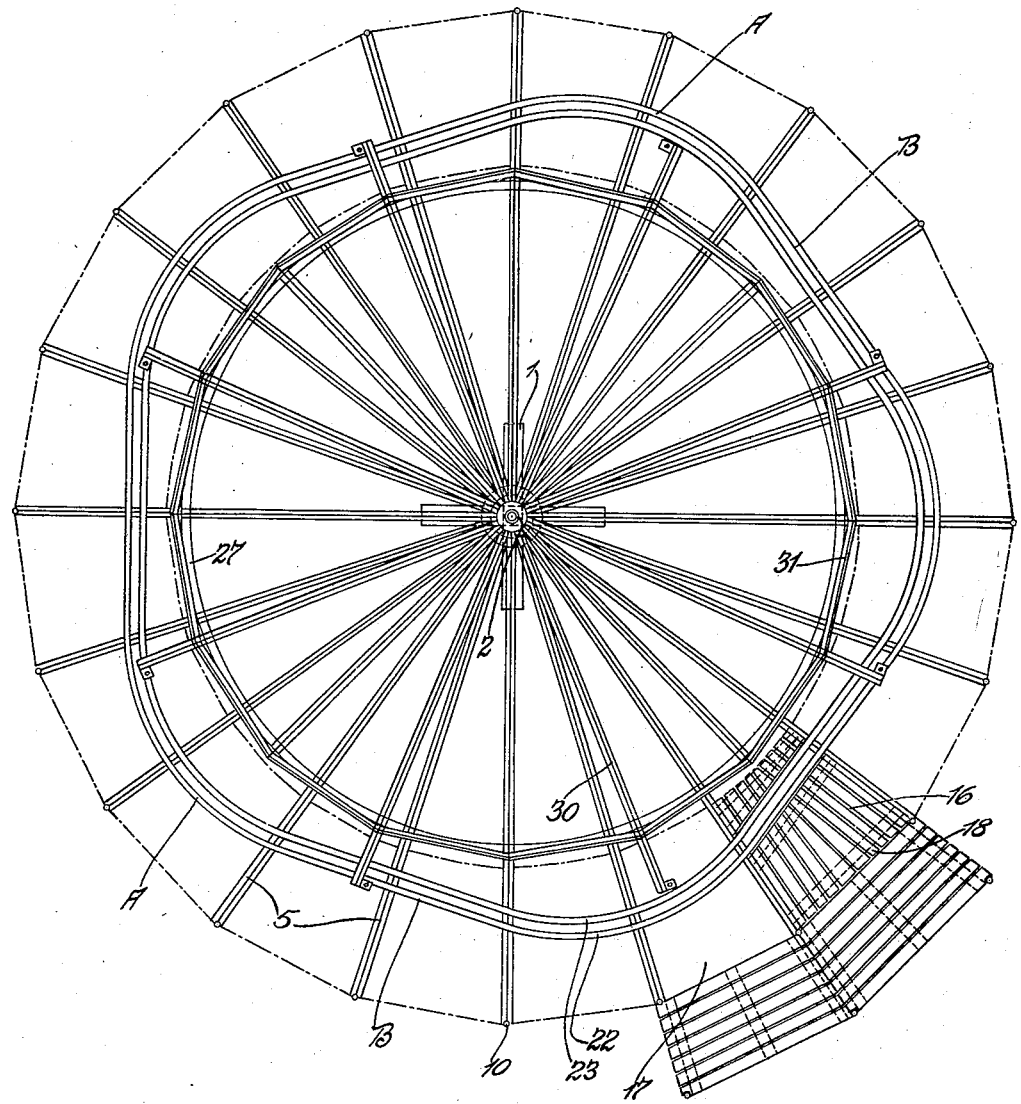

My improved amusement apparatus comprises a central vertical mast 1 mounted on a support 2. The mast 1 extends through a structure 3 rigid on the support 2 and surrounded by a rigid ring 4. From the ring 4 a number of arms 5 extend radially and have their outer ends supported preferably by adjustable supports. As shown (Fig. 3) the adjustable supports comprise a pair of toggle links 6 and a cooperating pair of toggle links 7, the upper ends of the toggle links being pivoted to the arms 5 and the lower ends of the toggle links being pivoted to a bar 8. A rod 9 has one end connected to the pivot of the toggle links 6 and extending through the pivot of the toggle links 7 and having a nut 9ª screwed thereon for holding the toggle links in an adjusted relationship. An upright 10 is attached to the outer end of each of the arms 5 and said uprights support a barrier 11 to exclude the public from the apparatus. Near their outer ends the arms 5 are rigidly connected by a number of frame members 12, 13, 14 and 15, so that a rigid stationary frame is obtained. An approximately annular floor is provided by securing floor boards 16 upon the frame elements 12 and 13, and 14 and 15 respectively. An entrance 17 to the apparatus and an exit 18 therefrom are provided through the barrier 11. The approximately circular platform or floor to which the public is admitted may be covered by a canopy 19 (Fig. 3) supported in part by the uprights 10 and in part by flexible connections 20 extending to the mast 1. This canopy may be extended, if desired, to provide an awning 21 over the entrance 17 and the exit 18.

The track upon which the vehicles are operated is supported by the rigid frame just described between the inner and outer edges of the floor 16. The track comprises a pair of angular parallel rails 22 and 23 rigidly supported above the arms 5 and forming a number of spaced curved portions A connected by eccentric portions B and forming a continuous track around the mast of the apparatus. The horizontal flanges of the rails 22 and 23 extend toward each other from the vertical flanges, which said vertical flanges are secured to laterally extended arms 24 of bars 25 removably secured between the two bars of which each arm 5 is composed (Figs. 11 and 12). The arms 24 rest upon the upper edges of the arms 5. The bars 25 extend between the two elements of each arm 5 and are secured thereto by removable bolts or pins 26.

An annular rail 27 is concentric with the mast 1 and is attached to the arms 5 beyond the inner edges of the floor 16. This rail comprises an angle bar having one flange extending horizontally inwardly upon the arms 5, while the other flange of said bar extends vertically at the outer edge of the horizontal flange of said bar (Fig. 3).

A hub 28 is rotative about the mast 1 upon an antifriction bearing 29. A number of arms 30 each comprising a pair of angle bars have their inner ends attached to the hub 28 and extend radially therefrom. The outer ends of these arms 30 are connected by angle bars 31 whereby a strong frame is obtained. A base plate 32 (Fig. 2) is attached to a number of the arms 30, and the motor 33 of the driving mechanism is mounted on said base plate. The motor 33 drives a shaft 34 (Fig. 10) having bevel gear driving connections 35 with a vertical shaft 36 mounted in a frame 37. A shaft 38 has a universal pivot connection 39 with the shaft 36 and extends downwardly through a radial slot 40 in a support 41 (Fig. 8). The support 41 is rigid with the rotary frame structure 30—31. The shaft 38 is rotative in a block 42 mounted for sliding movements in the support 41 radially toward and away from the motor 33 and the mast 1, so as to compensate for any irregularity of the track 27 from concentricity with the mast 1. A roller 43 is attached to the lower end of the shaft 38 and operates against the inside of the vertical flange of the track 27 (Figs. 8 and 10).

A roller 44 is rigid on an axle 45 journaled for rotation in an eccentric bushing 46 mounted for turning movements in the block 42. That is to say, the bushing 46 has an eccentric bore in which the axle 45 is rotatively journaled. Turning movements are imparted to the bushing 46 by a lever 47 attached to said bushing and under control of a spring 48 connecting the lever with the adjacent bar 31. Thus the roller 44 is caused to cooperate with the roller 43 to grip between them the vertical flange of the track 27 (Figs. 8 and 10). From this it is apparent that when the motor 33 is in operation the rotary frame will be caused to rotate by the effective operation of the roller 43 against the bracket 27 in cooperation with the roller 44.

Each vehicle preferably comprises a number of sections connected together in tandem, the front section comprising an enclosure 49 and the rear section comprising an enclosure 50 each having a seat 51 for accommodation of the patrons. Each seat has a hinged back 52. The front end of each seat is supported by a link 53 having its respective ends pivoted to the seat and to the floor of the section in which the seat is mounted. The two sections of each vehicle are connected by a releasable coupler 54.

Along the under side of the bottom of each enclosure 49 and 50 a supporting plate 55 is attached, and a support for each enclosure is secured to each of the supporting plates. The support for each enclosure comprises a frame 56 (Figs. 6 and 7) secured to the corresponding supporting plate 55 and provided on its upper end with a pair of spaced bearings 57 in which an axle 58 is journaled. On the ends of said axle 58 a pair of wheels 59 are mounted, at least one of said wheels being attached to the axle so that the axle is rotated by the wheel. The wheels 59 operate on the horizontal flanges of the rails 22 and 23, respectively, thereby supporting the enclosures 49 and 50. A frame 60 is attached to the rear end of each seat 51 and to the lower side of each of said frames a bearing 61 is secured. The shaft 58 extends through the bearing 61 and an eccentric 62 is attached to said shaft in said bearing and is rotated by the shaft. Thus, during the travel of the enclosures, the respective seats 51 are oscillated vertically, as is obvious (Fig. 6).

A vertical axle member 63 is supported by each frame 56, and these axles extend through the supporting plates 55 and through the corresponding frames 56. A wheel 64 is rotative on each axle 63 between the horizontal flanges of the track rails 22 and 23, so that lateral oscillatory movements are imparted to the respective enclosures 49 and 50 of the vehicles during rotation of the rotary frame. Flanges 65 on the wheels 64 extend under the horizontal flanges of the rails 22 and 23 so as to prevent derailment of the vehicles.

For each of the passenger vehicles two members of one of the arms 30 of the rotary frame extend to connection with a connecting element 66 (Figs. 2 and 4) having pivotal connection 67 with the forward end of the supporting plate 55 of the front enclosure of each passenger vehicle. Thus, it is apparent that when the rotary frame is rotated by the driving connections described, the various or individual passenger vehicles are operated along the track formed by the rails 22 and 23, and that lateral oscillatory movements are imparted to the different enclosures of the respective vehicles, and vertical oscillatory movements are imparted to the rear ends of the seats within the enclosures, all without possibility of derailments of the vehicles.

Further support to the rotary frame and the driving connections is obtained by mounting a wheel 68 between depending arms 69 at the rear end of the support 41 (Fig. 9). This wheel 68 operates on the horizontal flange of the track 27.

To enhance the unique attractiveness of the apparatus, each vehicle may be constructed in simulation of some animal. For this purpose, a head 70 may be mounted for lateral swinging movements on a vertical pivot 71 at the forward end of the front enclosure of each vehicle, and these heads may have illuminated eyes 72. Similarly, a tail 73 may be mounted for lateral swinging movements at the rear end of each rear enclosure by means of vertical pivots 74.

The outer portion of the rotary frame supports a wall or barrier 75 at the inner portion of the floor 16 to exclude the public from the central part of the apparatus, wherein the operating mechanism is mounted.

From the foregoing it will be apparent that I have provided an amusement apparatus of unique and distinctive construction comprising passenger vehicles, the occupied parts of which are given lateral and vertical oscillatory movements as an incident to operation of the device; and, that the machine may be operated without possibility of derailment of the vehicles and easily disassembled for transportation purposes. The construction and arrangement of the various parts may be varied within equivalent limits without departure from the nature and principle of the invention.

I do not restrict myself unessentially, but what I claim and desire to secure by Letters Patent is:

1. An amusement apparatus comprising a rigid frame, an eccentric endless track rigid on said frame, a truck, a pair of wheels mounted on said track and supporting said truck, a vehicle having one end supported by said truck, means supporting the opposite end of said vehicle, and a wheel supported by said truck between said pair of wheels and cooperating with said track to guide said truck along said track and prevent said pair of wheels from leaving said track.

2. An amusement apparatus comprising a rigid frame, an eccentric endless track rigid on said frame, a truck, a pair of wheels mounted on said track and supporting said truck, a vehicle having one end supported by said truck, means supporting the opposite end of said vehicle, a wheel supported by said truck between said pair of wheels and cooperating with said track to guide said truck along said track and prevent said pair of wheels from leaving said track, and mechanism for propelling said vehicle.

3. An amusement apparatus comprising a rigid frame, spaced rails forming an eccentric endless track on said frame, a rotary frame above said rigid frame, mechanism for rotating said rotary frame, a pair of spaced trucks, wheels operating on said rails and supporting said trucks, a vehicle supported by said trucks, an additional wheel supported by each of said trucks and cooperating with said rails to limit both lateral and upward movements of said trucks and prevent said first named wheels from leaving said rails, and a connection for operating said vehicle by said rotary frame.

4. An amusement apparatus comprising a rigid frame, spaced rails forming an eccentric endless track on said frame, a rotary frame above said rigid frame, mechanism for rotating said rotary frame, a pair of spaced trucks, wheels operating on said rails and supporting said trucks, a vehicle supported by said trucks, an additional wheel supported by each of said trucks and cooperating with said rails to limit both lateral and upward movements of said trucks and prevent said first named wheels from leaving said rails, a connection for operating said vehicle by said rotary frame, and means for raising and lowering the ends of said vehicle automatically and as an incident to the movement of said vehicle along said tracks.

5. An amusement apparatus comprising a rigid frame, spaced rails forming an eccentric endless track on said frame, a rotary frame above said rigid frame, mechanism for rotating said rotary frame, a pair of spaced trucks, wheels operating on said rails and supporting said trucks, a vehicle supported by said trucks, an additional wheel supported by each of said trucks and cooperating with said rails to limit both lateral and upward movements of said trucks and preventing said first named wheels from leaving said rails, a connection for operating said vehicle by said rotary frame, and head and tail elements pivoted to the front and rear ends respectively of said vehicle for lateral swinging movements.

6. An amusement apparatus comprising a central mast, rails forming an endless track around said mast, a rotary frame mounted for rotation about said mast, a track located approximately concentrically about said mast, mechanism mounted on said rotary frame and cooperating with said concentric track to rotate said rotary frame about said mast, a vehicle connected with said rotary frame, trucks for supporting said vehicle, wheels supporting said trucks and operating on said rails, and an additional wheel in connection with each of said trucks cooperating with said rails to limit upward and lateral movements of said first named wheels with respect to said rails.

7. An amusement apparatus comprising a central mast, rails forming an endless track around said mast, a rotary frame mounted for rotation about said mast, a track located approximately concentrically about said mast, mechanism mounted on said rotary frame and cooperating with said concentric track to rotate said rotary frame about said mast, a vehicle connected with said rotary frame, trucks for supporting said vehicle, wheels supporting said trucks and operating on said rails, an additional wheel in connection with each of said trucks cooperating with said rails to limit upward and lateral movements of said first named wheels with respect to said rails, and a device in each of said trucks for imparting vertical oscillatory movements to said vehicle.

8. An amusement apparatus comprising a rigid frame, a pair of spaced rails rigid on said frame and forming an eccentric endless track, a truck, a pair of spaced wheels mounted on said rails and supporting said truck, a vehicle having one end supported by said truck, means supporting the opposite end of said vehicle, and an additional wheel supported by said truck between and cooperating with said rails to guide said truck along the track formed by said rails and prevent said first pair of wheels from leaving said rails.

9. An amusement apparatus comprising a rigid frame, a pair of spaced rails rigid on said frame and forming an eccentric endless track, a truck, a pair of wheels mounted on the track formed by said rails and supporting said truck, a vehicle having one end supported by said truck, means supporting the opposite end of said vehicle, a frame supported by said truck between said pair of wheels, and a wheel supported by said frame between and cooperating with said rails to guide said truck along said track and prevent said pair of wheels from leaving said track.

10. An amusement apparatus comprising a rigid frame, a pair of spaced rails rigid on said frame and forming an eccentric endless track, a truck, a pair of wheels mounted on the track formed by said rails and supporting said truck, a vehicle having one end supported by said truck, means supporting the opposite end of said vehicle, a frame supported by said truck between said pair of wheels, a wheel supported by said frame between and cooperating with said rails to guide said truck along said track and prevent said pair of wheels from leaving said track, and mechanism for propelling said vehicle.

JAMES WHITELEY.